US007724397B2

(12) United States Patent
Lee et al.

(10) Patent No.: US 7,724,397 B2
(45) Date of Patent: May 25, 2010

(54) METHOD FOR COMPENSATING FOR INDUCED ARTIFACTS ON AN IMAGE TO BE PRINTED

(75) Inventors: Je-Ho Lee, Vancouver, WA (US); Jay S. Gondek, Camas, WA (US); Morgan T. Schramm, Portland, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1229 days.

(21) Appl. No.: 11/016,250

(22) Filed: Dec. 17, 2004

(65) Prior Publication Data

US 2006/0132538 A1 Jun. 22, 2006

(51) Int. Cl.
*G06T 5/00* (2006.01)
*H04N 1/60* (2006.01)

(52) U.S. Cl. ........................ 358/3.26; 358/1.9; 358/1.8; 358/3.06; 358/3.18; 358/463; 347/41; 347/43; 347/84; 347/40; 382/275

(58) Field of Classification Search ................ 358/3.26, 358/1.9, 501
See application file for complete search history.

(56) References Cited

U.S. PATENT DOCUMENTS

| | | | | |
|---|---|---|---|---|
| 5,959,645 | A * | 9/1999 | Gondek | 347/43 |
| 6,064,755 | A * | 5/2000 | Some | 382/132 |
| 6,179,407 | B1 * | 1/2001 | Bockman | 347/40 |
| 6,443,549 | B1 * | 9/2002 | Bitticker et al. | 347/15 |
| 6,540,315 | B1 * | 4/2003 | Nystrom et al. | 347/12 |
| 6,695,435 | B1 * | 2/2004 | Cheng et al. | 347/43 |
| 6,822,760 | B1 * | 11/2004 | Spaulding et al. | 358/1.9 |
| 6,830,306 | B2 * | 12/2004 | Couwenhoven et al. | 347/12 |
| 2002/0154830 | A1 * | 10/2002 | Nara | 382/254 |
| 2003/0081225 | A1 * | 5/2003 | Nakami et al. | 358/1.2 |
| 2003/0107639 | A1 * | 6/2003 | Field | 347/105 |

* cited by examiner

*Primary Examiner*—Benny Q Tieu
*Assistant Examiner*—Huo Long Chen

(57) ABSTRACT

A method for compensating for induced artifacts on an image to be printed includes processing the image to be printed. An image region of the image susceptible to at least one artifact is identified. An imaging process is modified to reduce an effect of the at least one artifact on the image region. The image is printed.

50 Claims, 8 Drawing Sheets

METHOD FOR COMPENSATING FOR INDUCED ARTIFACTS ON AN IMAGE TO BE PRINTED

BACKGROUND

Mechanically induced artifacts are common in inkjet printing. Mechanically induced artifacts can result from a variety of sources, including ink dot placement errors, line feed errors, and nozzle malfunctions and mis-directions. In addition, mechanically induced artifacts can be caused by media or paper shape and thickness, the mechanics of the rollers within the inkjet printer, as well as other mechanical issues.

Mechanically induced artifacts can appear in the printed image in a variety of forms including grainy appearance, color-shifts, or banding in the printed image. In addition, it has been identified that certain colors or half-tone dot patterns are particularly susceptible to defects caused by various mechanically induced artifacts. For example, one banding issue is a top of the form transfer error. This error includes a random ink dot shift at the top of an image during printing caused by mechanical feed issues before the page is fed sufficiently into the inkjet printer. As such, pinch rollers do not exhibit adequate control over the page and do not provide a steady state atmosphere for the page. Likewise, another banding issue is a bottom of the form transfer error. This error occurs toward the bottom of an image when the page leaves the pinch rollers of an inkjet printer, thereby losing a control feature of the printer. Bottom of the form transfer errors are more prevalent in full-bleed printing as compared to non-full-bleed printing. Full-bleed printing is known as printing entirely to the edge of the media sheet without leaving an unprinted margin or border. Media shape and thickness issues also play a role in both errors. In both examples, the error occurs due to the page either being transitioned into the pinch rollers of the inkjet printer (top of the form transfer error) or being transitioned out of the pinch roller of the inkjet printer (bottom of the form transfer error).

In general, mechanically induced artifacts are more visible to the human eye in relatively uniform image areas. Also, mechanically induced artifacts are more visible where the ink dot fill is designed to cover each addressable pixel location on the page with a single ink drop, also known as 100 percent fill.

Previously, one known approach to reduce mechanically induced artifacts is to improve the individual mechanical components of an inkjet printer in an attempt to improve the accuracy of the printer. Another known approach is to print the areas of the image associated with mechanical induced artifacts at a slower speed and with additional passes, in an attempt to correct the problems. Yet another approach is to stop printing at a transition area, feed the page out a predetermined amount, and then resume printing.

Improving mechanical components is a robust solution, but can be costly in terms of direct material and increased production costs. Printing with additional passes at a slower speed, while generating fewer mechanically induced artifacts, substantially increases the print time for every print job, including images that are not susceptible to mechanism artifacts, thereby reducing the efficiency of the printer. Feeding the page out without printing necessitates an unwanted visual discontinuity where at least one line of addressable pixels does not contain any ink.

SUMMARY

One aspect of the present invention provides a method for compensating for induced artifacts on an image to be printed. The method includes processing the image to be printed. An image region of the image susceptible to at least one artifact caused by at least one mechanical error is identified. An imaging process is modified to reduce an effect of the at least one artifact on the image region. The image is printed.

DETAILED DESCRIPTION

In the following Detailed Description, reference is made to the accompanying drawings, which form a part hereof, and in which is shown by way of illustration specific embodiments in which the invention may be practiced. In this regard, directional terminology, such as "top," "bottom," "front," "back," "leading," "trailing," etc., is used with reference to the orientation of the Figure(s) being described. Because components of embodiments of the present invention can be positioned in a number of different orientations, the directional terminology is used for purposes of illustration and is in no way limiting. It is to be understood that other embodiments may be utilized and structural or logical changes may be made without departing from the scope of the present invention. The following Detailed Description, therefore, is not to be taken in a limiting sense, and the scope of the present invention is defined by the appended claims.

Figure 1:
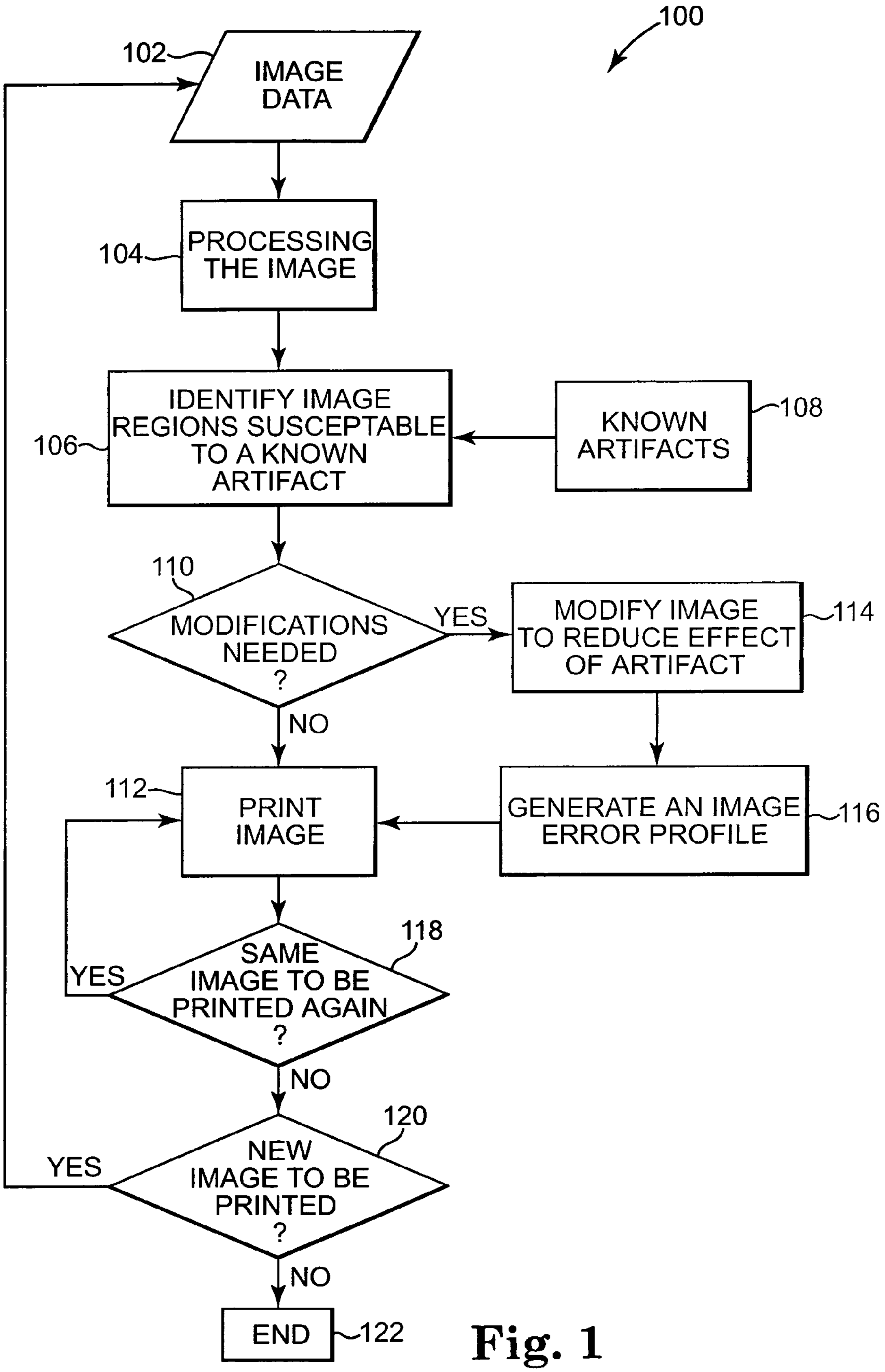
FIG. 1 is a flow chart illustrating a method for compensating for mechanically induced artifacts on an image in accordance with embodiments of the present invention.

FIG. 1 is a flow chart illustrating artifact compensation method 100 according to an embodiment of the present invention. Artifact compensation method 100 provides an imaging solution for induced artifacts on an image to be printed, including mechanically induced artifacts. At step 102, image data regarding a specific image to be printed is provided to an inkjet printer. In one embodiment, the image data is provided to the printer via a print command from a computer or central processing unit ("CPU") electrically coupled to the printer. In another embodiment, image data regarding the image to be printed is scanned in or fed through the printer, and a print button depressed directly on the printer. Other known methods of providing image data to the printer are also acceptable.

At step 104, the image to be printed is processed within the inkjet printer such that numerous aspects of the print image are identified in preparation for printing. For example, specific combinations of ink are identified for each and every addressable pixel location of the print image. In addition, the percentage of ink fill throughout the print image is identified. Also, the size and quality of the print image are identified. Further, various information is processed, which, in combination, permit the printer to properly print the desired image.

At step 106, image regions of a print image susceptible to known artifacts are identified. At step 108, artifacts that are empirically known are accessed. The known artifacts are identified from previous print processing jobs or from empirical information stored within the driver of the printer. Information or data regarding the known artifacts are identified from data stored in a driver of the inkjet printer. The driver of the inkjet printer can warehouse a variety of information and data including information and data regarding the same or similar print images as the print image currently undergoing processing. The driver can also warehouse information and data pertaining to specific image regions which are the same or similar to image regions of the print image currently undergoing processing.

At steps 104 and 106, an image to be printed is processed image region by image region, and "trouble" regions are identified. "Trouble" regions are regions in which artifacts within the print image, such as mechanically induced artifacts, are visible to the naked eye. One example of a known mechanically induced artifact identified at step 108 is a top of the form transfer error. This banding issue error includes a random dot shift of ink drops at the top of a media page during printing caused by mechanical feed issues before the page is sufficiently fed into the inkjet printer. As such, the pinch rollers of the inkjet printer do not exhibit control over the page and do not provide a steady state atmosphere for the page. Likewise, another known banding issue identified at step 108 is a bottom of the form transfer error. This error also includes a random dot shift of ink drops and occurs toward the bottom of the media page due to the page leaving the pinch rollers of the inkjet printer. The printer, thereby, loses a control feature over the page. In one embodiment, a bottom of the form transfer error occurs between approximately one-fourth of an inch to one inch from the bottom of the page and is approximately one-half of an inch wide. Both top of the form transfer errors and bottom of the form transfer errors are more prevalent in full-bleed printing, where ink is supplied to the print media throughout the entire surface of the print media, without unprinted borders. However, these errors can also occur in non-full-bleed printing. Imaging solutions for form transfer errors will further be discussed with reference to later figures.

Figure 2B:
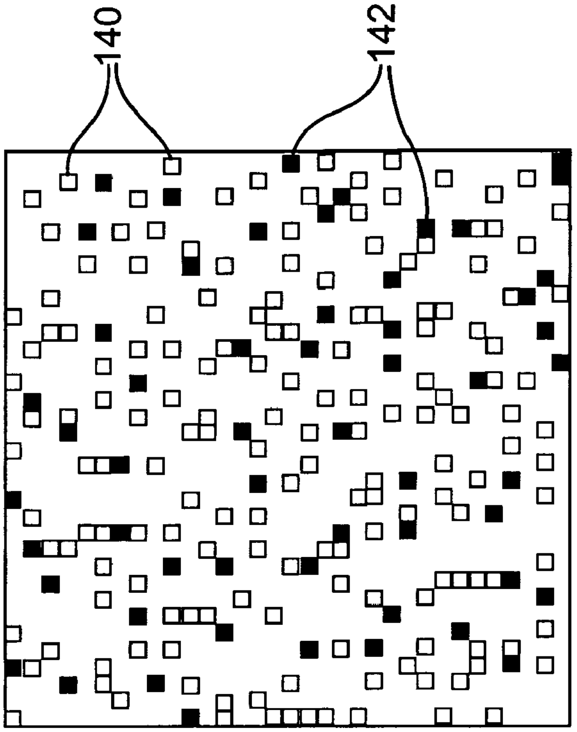
FIGS. 2A and 2B are pictorial representations of ink drop locations in an image region.
Figure 2A:
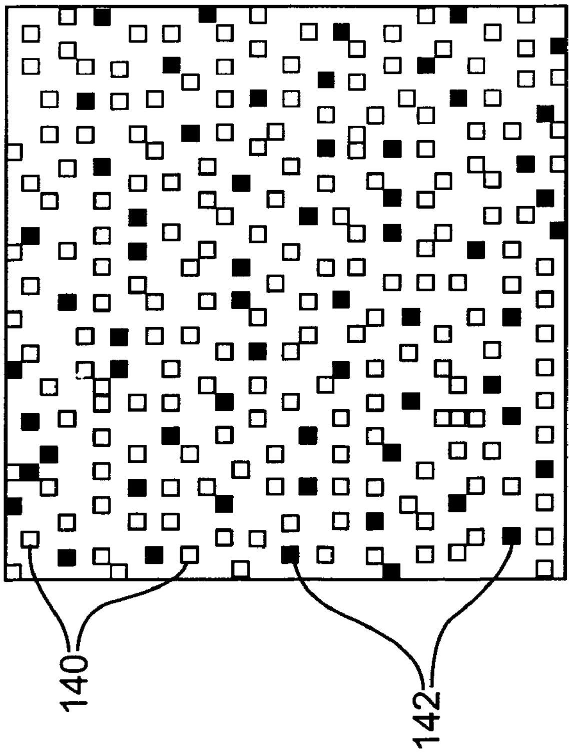

FIG. 2A is a pictorial representation of ink drop locations of ink dots 140 and 142. While only two distinct types of ink drops are shown in FIG. 2A, it is understood that several distinct types of ink drops can be located within the pictorial representation of FIG. 2A without deviating from the present invention. In one embodiment, three, four, six, eight, or more types of ink drops can be provided by an inkjet printer system. In an embodiment, having four distinct types of ink drops, the colors of the four distinct types of ink drops usually include cyan, magenta, yellow, and black. However, for clarity purposes, only two types of ink drops colors are shown. As shown in FIG. 2A, the pattern of ink drop placement is substantially uniform, with most types of ink drops spacially positioned from all other types of ink drops. The pictorial representation of FIG. 2A represents ink drop placement or locations of types of ink drops in an image region of an image in which no artifacts are inducing errors. Conversely, as shown in FIG. 2B, the location and placement of ink drops 140 and 142 are no longer substantially spatially located throughout the image region. Rather, a large percentage of types of ink drops are located adjacent one or more other types of ink drops. In addition, several types of ink drops can be overlapping other types of ink drops. The pictorial representation of FIG. 2B represents an image region in which errors are induced due to artifacts. As compared to the pictorial representation shown in FIG. 2A, the pictorial representation shown in FIG. 2B appears "noisy" to the human eye. Therefore, an image printed with image regions having induced artifacts (FIG. 2B) does not print with the proper clarity as compared to an image printed without induced artifacts (FIG. 2A).

Referring again to FIG. 1, at step 106, identifying image regions susceptible to known artifacts also includes identifying certain colors, combination or colors, or half-tone densities susceptible to various artifacts. Artifacts sometimes visible to the human eye include certain colors in combination with the percentage of ink fill or the percentage of an image page covered by ink. Empirically, it is understood that some color combinations, such as those combinations making up the color of the blue sky in a print image, are susceptible to banding artifacts when combined with a percent ink fill in the range of approximately 75-125 percent. 100 percent ink fill equates to a single ink drop for each addressable pixel location throughout the entire print image, or image region. The combination of colors used to generate the blue coloring of the sky in a printed image is only one example of a color susceptible to artifacts when combined with a 100 percent ink fill.

Half-toning patterns or frequency of information in conjunction with, or instead of, color information can also be used in identifying image regions susceptible to a known artifact. A half-tone process is a coloring and shading technique. Half-toning includes breaking up an imaging into a series of dots or pixels. Pixel fill combinations determine color, shading, and intensity, and permit reproduction of the full-tone range of a photograph or artwork. By applying various ink drops or combination of ink drops at pixel locations throughout the print image, the print image can replicate an image shown on a screen, such as a computer display; or replicate a color image provided to an inkjet printer via a variety of input means, including scanning the image into the inkjet printer, mechanically feeding the image into the inkjet printer, or electrically providing the image via coupling from a computer or CPU.

Therefore, at step 106, image regions susceptible to a known artifact, including images suffering from coloring artifacts or half-toning artifacts, are identified. Imaging solutions associated with coloring artifacts issues and half-toning issues will further be discussed with reference to later figures.

At step 110, it is determined whether modifications to the imaging process are needed to correct image regions susceptible to identified artifacts. If modifications are not necessary, the image is printed, as shown at step 112. However, if modifications are needed, image data associated with the image or particular image regions is modified to reduce the effect of the known artifact, as shown at step 114. Therefore, the image data associated with the image to be printed is modified prior to printing the image at step 112. Thus, during the print process, corrections for induced, known artifacts are applied to the image. At step 116, an image error profile is generated, which includes data or information regarding the induced artifact for future reference. After printing the image at step 112, it is determined whether another copy of the print image associated with image data 102 has been requested as shown at step 118. If such a request has been made, the image is printed again, as shown at step 112. Conversely, if there has been no request to reprint the same image, it is determined at step 120 whether a new image to be printed is requested. If a new image to be printed is requested, artifact compensation method 100 is repeated, beginning with image data step 102. If a new image is not requested at step 118, the process is complete, as shown at end step 122.

Figure 3:
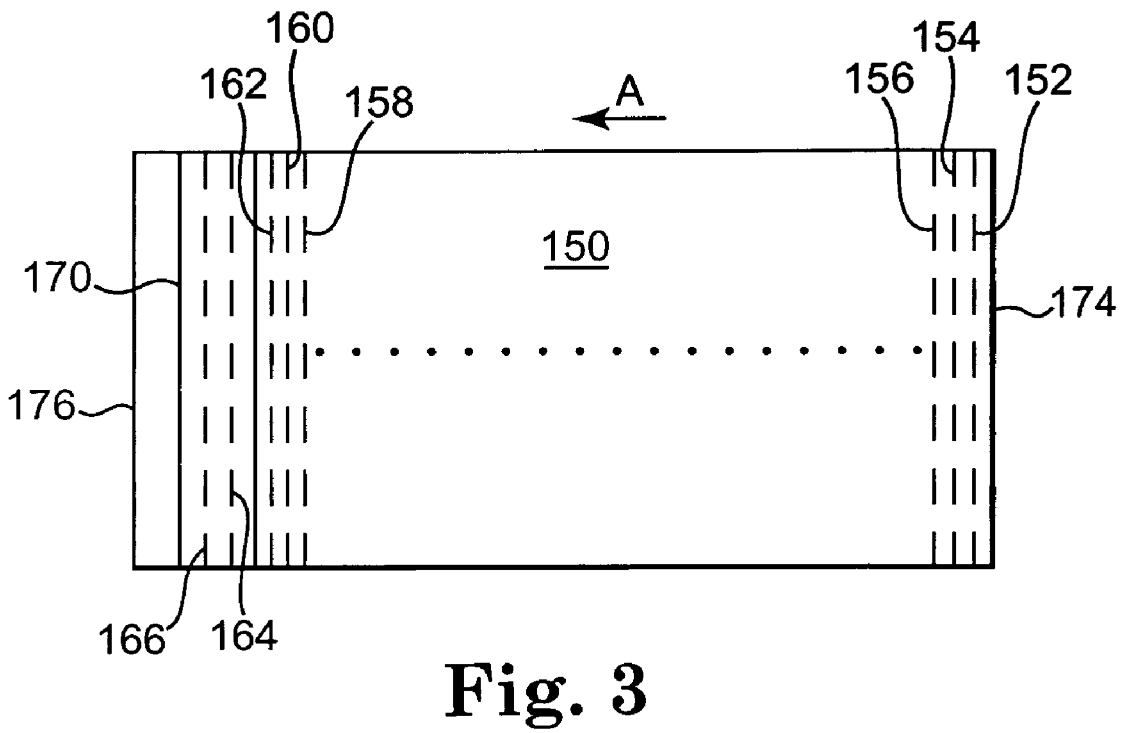
FIG. 3 is a pictorial image illustrating the locations of lines of ink drops and the location of a bottom of the form transfer area.

FIG. 3 illustrates an exemplary pictorial image 150. Pictorial image 150 includes lines of ink drops 152-166 and bottom of the form transfer error area 170. The page on which pictorial image 150 is fed through an inkjet printer is in a direction shown by arrow A such that top surface 174 is fed through the inkjet printer first, while bottom surface 176 is fed through the inkjet printer last. It is understood that numerous lines of ink drops, similar to lines of ink drops 152-166, are provided between each illustrated pair of lines of ink drops, but are not included in FIG. 3 for clarity purposes. It is also understood that each line consists of numerous addressable pixel locations. For example, in a full-sheet print at 1,200 dots per inch (dpi), such as an 8½×11 inch form or page, there are approximately 10,200×13,200 pixels. Therefore, there are approximately 13,200 pixel lines, each line having approximately 10,200 pixels in each line. However, for clarity purposes, only eight lines of ink drops or pixels are shown in FIG. 3.

Bottom of the form transfer region 170 represents the region in which there is an increased error in ink dot placement. This error occurs due to mechanics of the rollers of an inkjet printer, as well as the shape and thickness of the print media. A random ink dot offset, as shown in FIG. 2B, increases the grain and noise within region 170 and changes the color and clarity of region 170. In one example, the defect caused in region 170 is primarily visible as a color shift. The ink dot placement error generally occurs in relatively smooth image areas, and is magnified when ink dot fill just covers white space, such as in the range of approximately 75-125 percent ink fill, and more specifically 100 percent ink fill.

Figure 4:
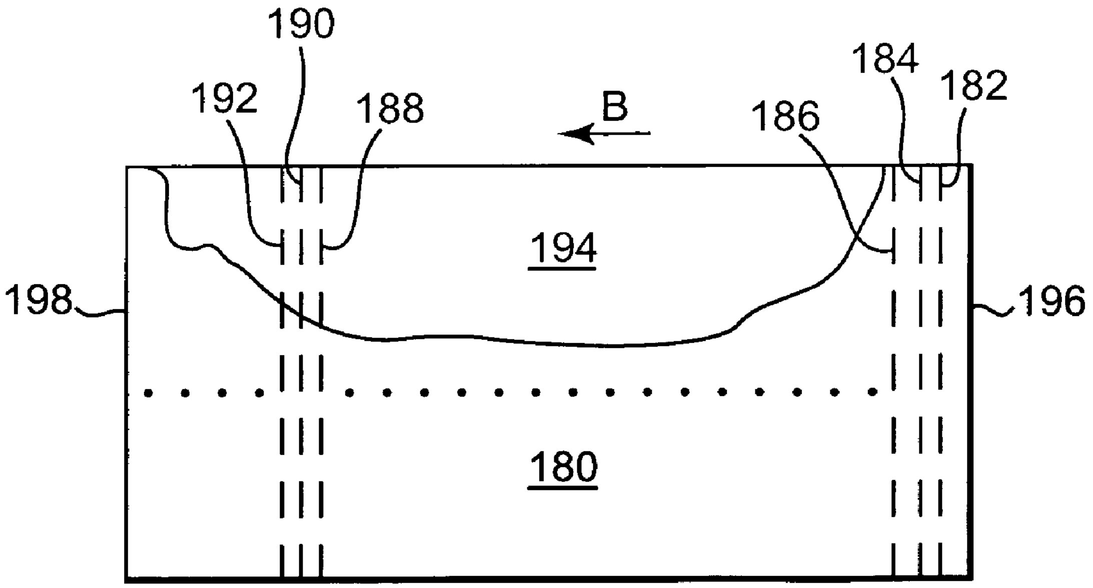
FIG. 4 is a pictorial image illustrating the locations of lines of ink drops and the location of an induced artifact error region.

FIG. 4 illustrates an exemplary pictorial image 180. Pictorial image 180 includes lines of ink drops 182-192 and induced artifact 194. The page on which pictorial image 180 is fed through an inkjet printer is in a direction shown by arrow B such that top surface 196 is fed through the inkjet printer first, while bottom surface 198 is fed through the inkjet printer last. It is understood that numerous lines of ink drops, similar to lines of ink drops 252-262, are provided between each illustrated pair of lines or ink drops, but are not included in FIG. 4 for clarity purposes. It is also understood that each line consists of numerous addressable pixel locations. Artifact induced error 194 represents the region in which there is an increased error in the ink dot placement. This error occurs due to specific color combinations when combined with a percent ink fill in the range of approximately 75-125 percent. In one embodiment, induced artifact region 194 represents a sky blue color portion of pictorial image 180, while pictorial image 180 represents an outdoor picture including a substantial amount of blue sky. A random ink dot offset, as shown in FIG. 2B increases the grain and nose within region 194 and changes the color and clarity of region 194. In one example, the defect caused in region 194 is primarily visible as a color shift. The ink dot placement error generally occurs in relatively smooth image areas, and is magnified when ink dot fills just covers white space, such as a 100 percent ink fill.

Again, referring to FIG. 1 at steps 114 and 116, a profile of the intensity of ink dot placement error is generated. A random ink dot placement model is used to determine the amount of ink absorption efficiency which is lost for a random offset of the ink dots. In regions of sparse fill, such as regions having less than 75 percent ink fill, the amount of ink absorption efficiency which is lost is minimal due to the sparse placement of ink drops. In regions of near-complete white space fill, such as in the range of 75-125 percent ink fill, a random ink dot displacement causes significant overlap of ink dots, increases the amount of white space within the print image, and alters the shade of the color that was near fill such that the color visually appears lighter than intended. In over-saturated ink regions, such as regions having greater than 125 percent ink fill, the amount of ink absorption efficiency which is lost is again minimal due to minimal white space.

The image error profile describes the shape of the artifact error. A correction factor is determined for each pixel location on the page taking into account the location on the page of the image error and the combination of colors for the particular pixel location. Ink values at each pixel location of the page are multiplied by the correction factor, thereby generating corrected ink values or amounts. These corrected ink amounts are used to print the various ink lines, such as ink lines 152-166 shown in FIG. 3, and ink lines 182-192 shown in FIG. 4, thereby reducing the visual color error.

Figure 5:
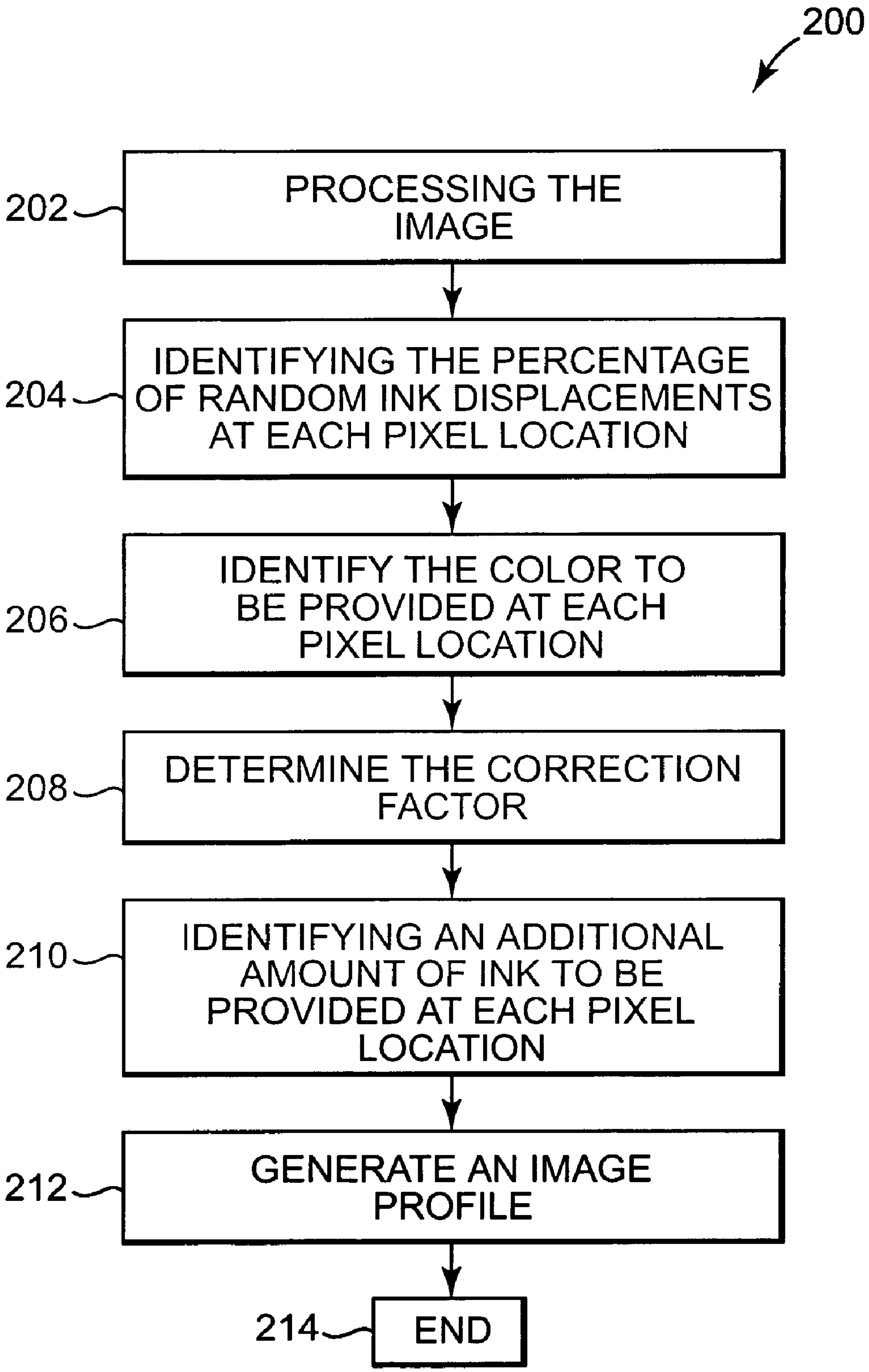
FIG. 5 is a flow chart illustrating a method for determining a correction factor associated with an artifact in accordance with embodiments of the present invention.
Figure 6:
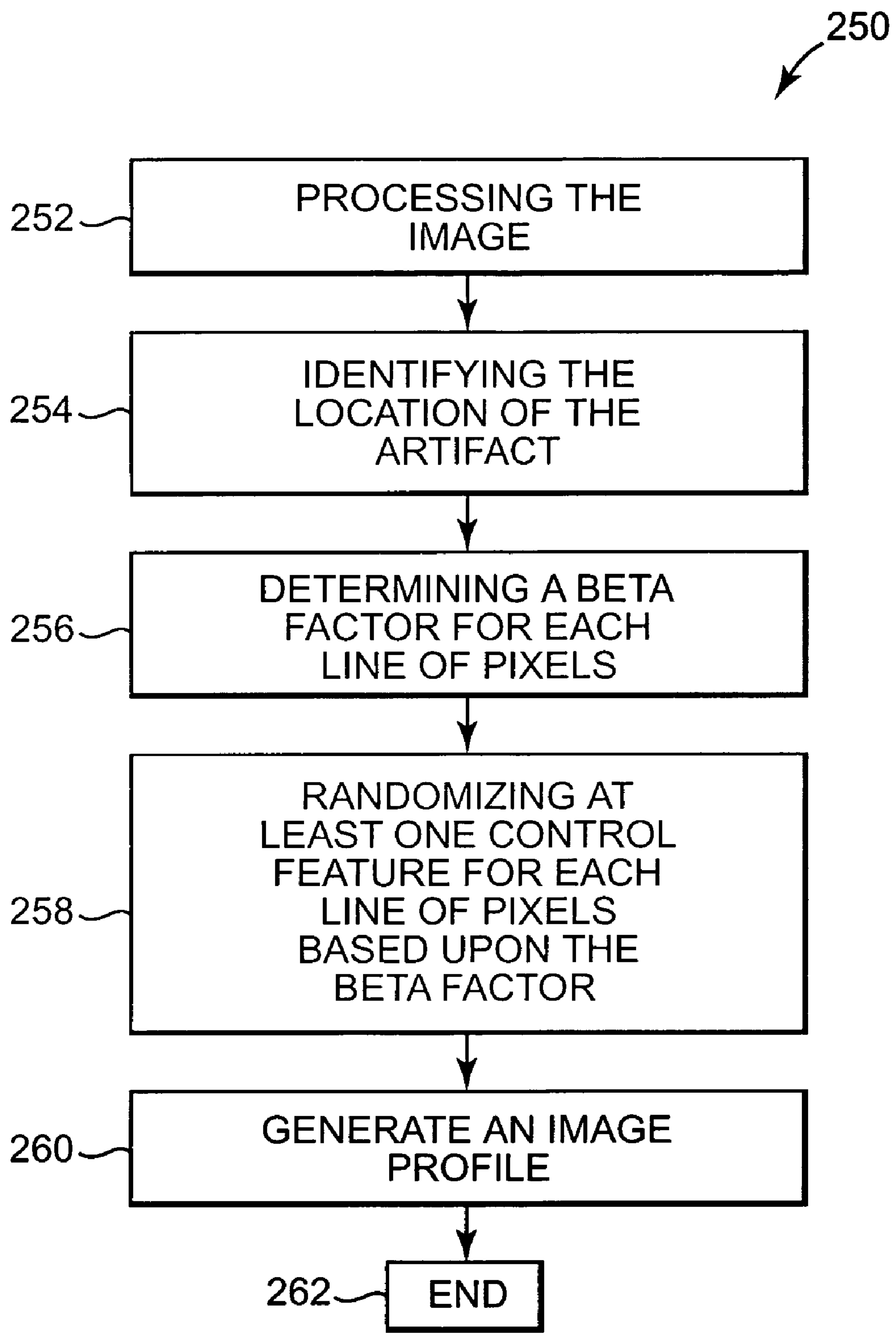
FIG. 6 is a flow chart illustrating a randomizing pixel location process associated with an artifact in accordance with the present invention.

More specifically, FIGS. 5 and 6 illustrate flow charts 200 and 250 for determining a correction factor associated with an artifact and a randomizing pixel location process, respectively. Flow charts 200 and 250 each represent a distinct solution to the issue of induced artifacts on an image to be printed. At step 202 of FIG. 5, the image to be printed is processed. At step 204, a mask or error profile is created and includes identification of the percentage of random displacement of ink drops, line-by-line or pixel-by-pixel, from top surface 174 to bottom surface 176 of image 150 shown in FIG. 3, or from top surface 196 to bottom surface 198 of image 180 shown in FIG. 4.

Figure 7:
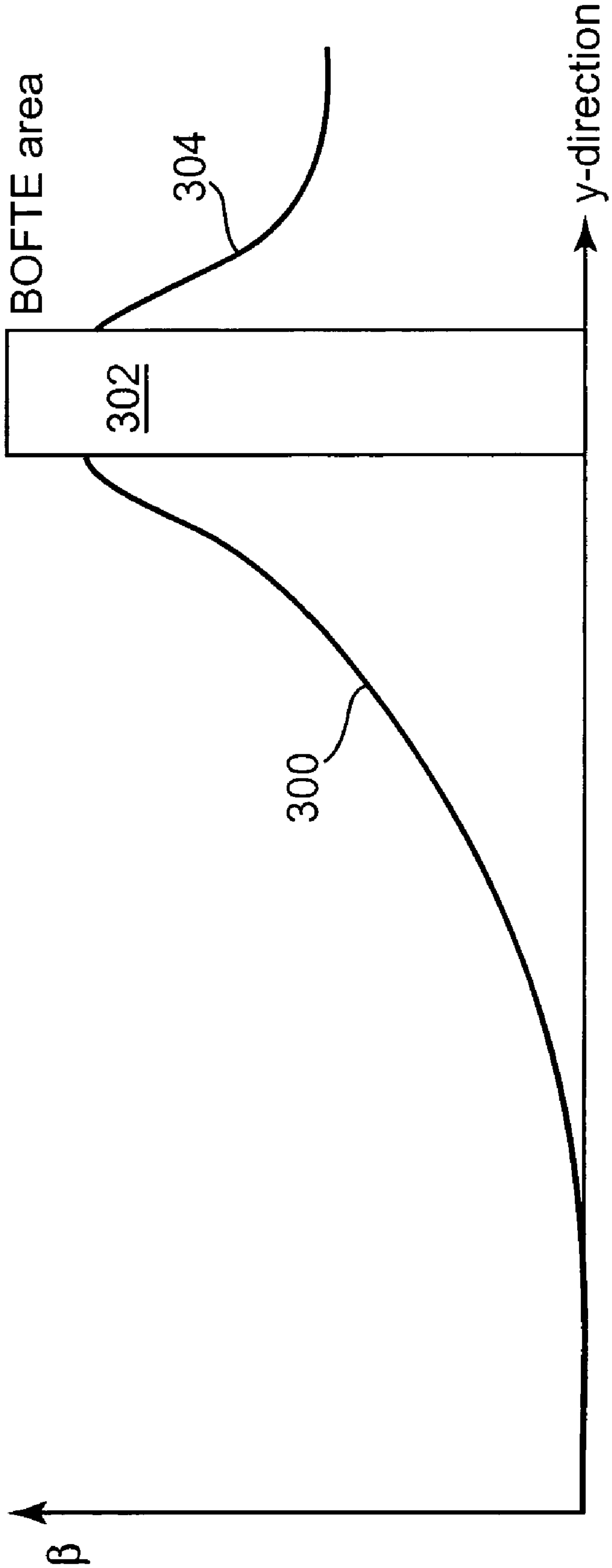
FIG. 7 is a graph illustrating a portion of a correction factor used to correct mechanical artifacts on an image.

FIG. 7 is a graph illustrating the percentage of random displacement of ink drops, line-by-line, through an exemplary image to be printed; the image including a bottom of the form transfer error 302. It is understood that other induced artifact errors are not shown in FIG. 7 for clarity purposes. With the displacement artifact region near the bottom of the page, such as bottom of the form transfer region 302 of FIG. 7, the random displacement at the top of the page is approximately 0. In other words, there is no random displacement at the top of the page since the top of the page is distally located from the artifact-affected region. As the mask or error profile travels down the page, as shown as the y-direction in FIG. 7, and gets closer to the artifact-affected region, the percentage of random ink displacements 300 ramps up in a bell-shaped curve. The percentage of random ink displacement ramps up to a maximum at the artifact-affected region 302, where the displacement of ink is totally random. In one embodiment, the percentage of random ink displacement at artifact-affected region 302 is 100 percent. In other words, the dots of ink are going down with no specific pattern. As the mask or error profile travels away from the artifact-affected region, the percentage of random ink displacements 304 ramps down indicating that less and less ink drops are being randomly displaced. In one embodiment, a percentage of ink drops that are randomly displaced ramps down at a slower rate after the artifact-affected region than the ramping up of random displacement of ink drops prior to the artifact-affected region.

In addition to identifying the percentage of random displacement of ink drops, at step 206 of FIG. 5, the color or combinations of inks used to generate specific colors at each line or pixel location is identified. At step 208, a correction factor is determined for each pixel or line location, based upon two variables: 1) the location on the page or y-direction and associated percentage of random ink dot displacement caused by an artifact at that location, and 2) the color or combination of inks at that location. At step 210, the correction factor is multiplied by the amount of each ink color that would be put down at a given location without the presence of an artifact, thereby generating a new amount of ink to be put down to correct for the artifact. Therefore, line and pixel locations located both out of and within affected region 302 are compensated by additional amounts of ink to minimize the visual effects of the artifact. At step 212, a new image profile is generated and followed during a subsequent printing of the image. The correction factor process is then complete, as shown by end step 214.

Expanding the correction factor process, the determined correction factor for a particular location can be multiplied by each of the amounts of cyan, magenta, yellow, and black, to be put down under conditions of no artifacts; thereby generating a new amount of cyan, magenta, yellow, and black to be put down in that region.

FIG. 6 is a flow chart illustrating randomizing pixel location process 250. Randomizing pixel process 250 introduces half-toning pattern noise, rather than pixel noise, into an image to be printed to mask out artifacts from the human visual system. The half-tone pattern noise is generated by randomly displacing half-tone pixels by a distributing parameter, β. In one embodiment, where β is maximized, all pixels are displaced in a predetermined direction, either right, left, up, or down equally. If β is minimized, no pixels will be displaced. For each value of β between the minimum number and the maximum number, an equivalent percentage of pixels will be displaced. In one embodiment, based upon the β factor, the percentage of pixels to be displaced is randomized. In another embodiment, based upon the β factor, the direction of displacement is randomized. In yet another embodiment, based upon the β factor, the distance of displacement in one or more directions of a pixel location is randomized.

The β factor is a function of the physical location on the page of the pixel or line to be printed and of the physical location of the artifact to be corrected. The highest bid value equates to image regions associated with the identified trouble region to be corrected. The β values reduce in magnitude as the location of pixels moves away from the image region to be corrected. Various shapes of β curves, as well as varying the highest point of the β value, can be used for different printer mechanics to fully exploit the flexibility of randomizing pixel process 250.

Referring to FIG. 6, at step 252, the image to be printed is processed. At step 254, the location of a known artifact within the image to be printed is identified. At step 256, a β factor for each line of pixels is determined. The β factor is determined based upon the location of specific pixels or of the specific line of pixels in conjunction with the location of the known artifact to be corrected. At step 258, at least one control feature for each line of pixels is randomized based upon the beta factor. In one embodiment, the percent of chance that a drop of ink may be shifted, either in a known or unknown direction is randomized. In another embodiment, the direction in which a drop of ink is shifted is randomized. In yet another embodiment, the amount of pixel shift for a drop of ink is randomized. In yet another embodiment, the pattern of placement of ink drops is randomized in that both the direction and the amount of displacement are randomized. Therefore, line and pixel locations located both out of and within an artifact affected region are compensated by randomizing the location of distributed ink drops to minimize the visual effects of the known artifact. At step 260, a new image profile is generated and followed during a subsequent print of the image. The randomized pixel process is then complete, as shown by end step 262.

Figure 8:
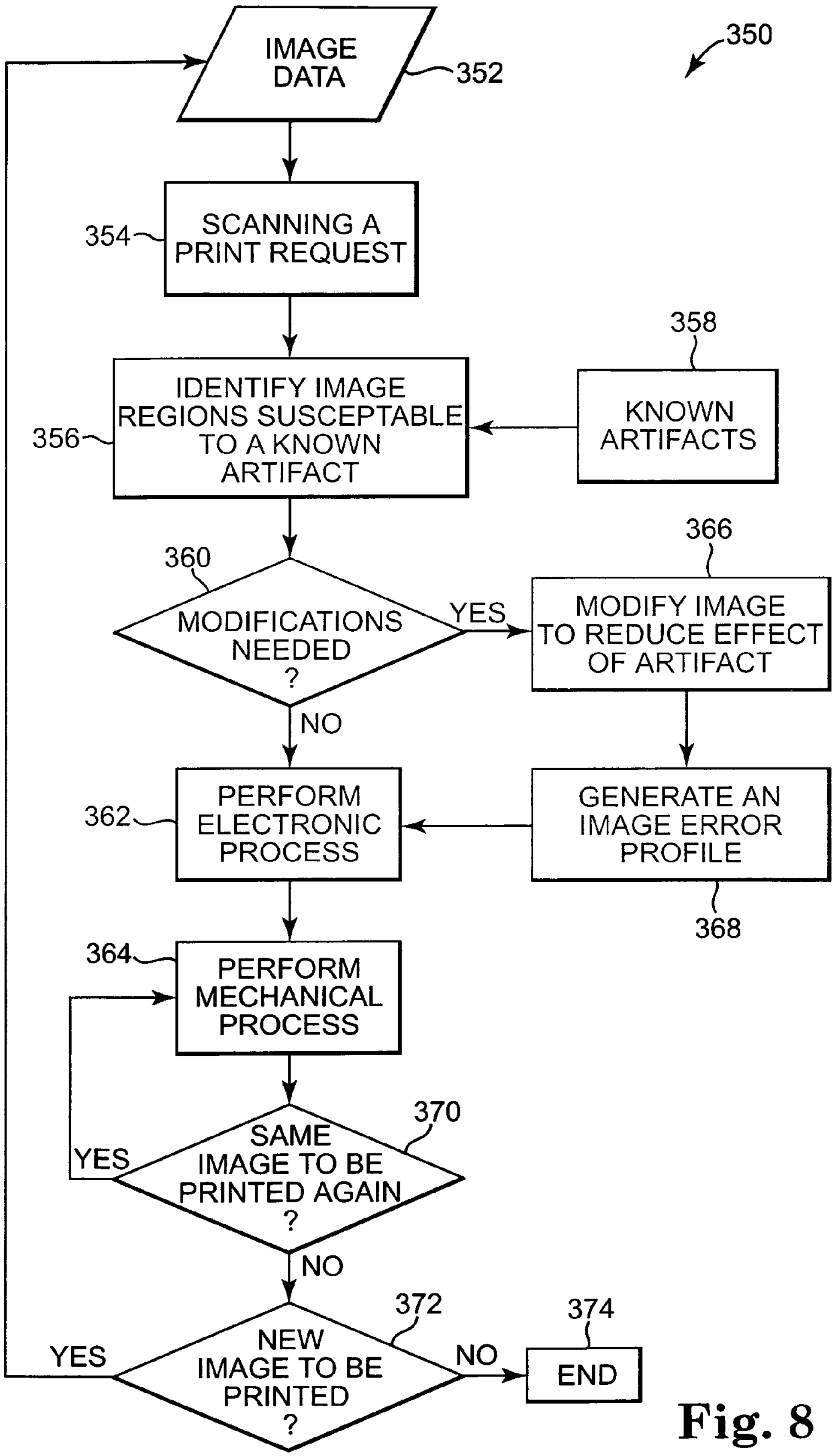
FIG. 8 is another flow chart illustrating a method for compensating for mechanically induced artifacts on an image in accordance with embodiments of the present invention.

FIG. 8 is a flow chart illustrating another artifact compensation method 350. Artifact compensation method 350 provides an imaging solution for induced artifacts on an image to be printed, including mechanically induced artifacts. At step 352, image data regarding a specific image to be printed is provided to an inkjet printer. In one embodiment, the image data is provided to the printer via a print command from a computer CPU electrically coupled to the printer. In another embodiment, image data regarding the image to be printed can be scanned in or fed through the printer, and a print button depressed directly on the printer. Other known methods of providing image data to an inkjet printer are also acceptable.

At step 354, the image to be printed is scanned or reviewed within the inkjet printer such that numerous aspects of the print image are identified in preparation for printing. For example, specific combinations of ink are identified for each and every addressable pixel location of the print image. In addition, the percentage of ink fill throughout the print image is identified. Also the sizing quality of the print image are identified. Further, various information is scanned, which, in combination, permit the printer to properly print the desired image.

At step 356, image regions of a print image susceptible to known artifacts are identified. At step 358, artifacts that are empirically known are accessed. The known artifacts are identified from previous print processing jobs or from empirical information stored within the driver of the printer. Information or data regarding the known artifacts are identified from the data stored in a driver of the inkjet printer. The driver of the inkjet printer can also warehouse a variety of information and data including information and data regarding the same or similar print images as the print image currently undergoing processing. The driver can also warehouse information and data pertained to specific image regions which are the same or similar to image regions of the print image currently undergoing processing.

At steps 354 and 356, an image to be printed is scanned image region-by-image region, and "trouble" regions are identified. "Trouble" regions are regions in which artifacts within the print image, such as mechanically induced artifacts, are visible to the naked eye. Examples of known mechanical induced artifacts identified at step 358 include top of the form transfer errors, bottom of the form transfer errors, and certain colors, combination of colors, or half-tone densities susceptible to various artifacts.

At step 360, it is determined whether modifications to the image process are needed. If modifications are not necessary, an electrical process is performed, as shown at step 362 in preparation for printing the image. In one embodiment, the electrical process can include generating, altering, and/or storing software within the inkjet printer necessary to print the desired image with minimal effects from the induced artifacts. At step 364, a mechanical process is performed. In one embodiment, the mechanical process includes feeding a page of printable material through the inkjet printer and providing at least one of the colors cyan, magenta, yellow, and black to the page of printable material via mechanical and electrical steps including firing a plurality of ink nozzles such that ink drops are properly provided to the page of printable material in accordance with the electrical process shown at step 362.

At step 360, if image modification is needed, the image is modified to reduce the effect of the identified artifacts, as shown at step 366. Therefore, the image data associated with the image to be printed is modified prior to printing the image. Thus, during the print process, correction for induced, known artifacts are applied to the image. At step 368, an image error profile is generated, which includes data or information regarding the induced artifact for future reference. The electrical and mechanical processes of steps 362 and 364, respectively, are then performed.

At step 370, it is determined whether another copy of the print image associated with image data 352 has been requested. If such a request has been made, the image is printed again, as shown at step 364. Conversely, if there has been no request to reprint the same image, it is determined at step 372 whether a new image to be printed is requested. If a new image to be printed is requested, artifact compensation method 350 is repeated, beginning with image data step 352. If a new image is not requested at step 370, the process is complete, as shown at end step 374.

Figure 9:
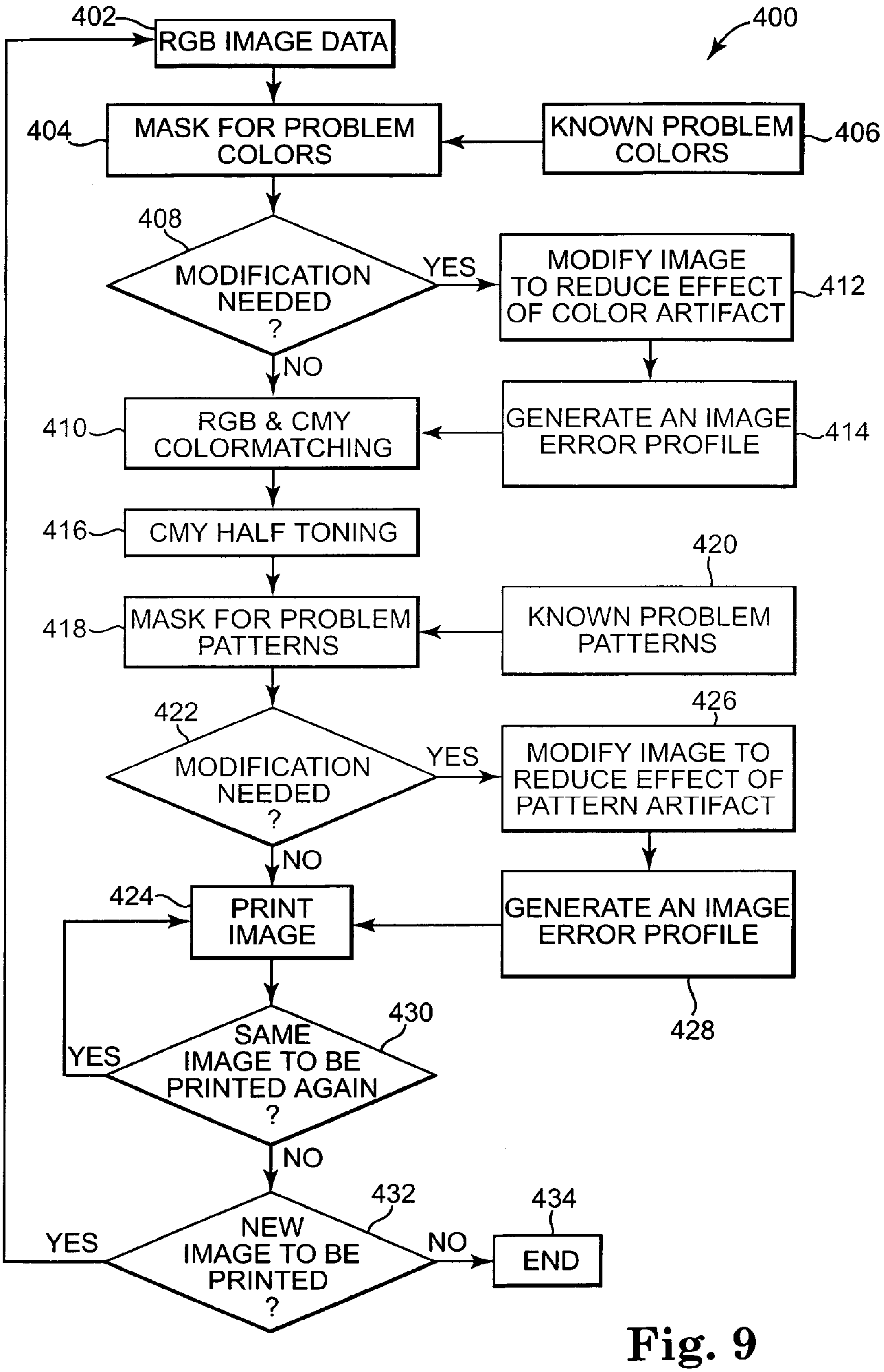
FIG. 9 is yet another flow chart illustrating a method for compensating for mechanically induced artifacts on an image in accordance with embodiments of the present invention.

FIG. 9 is another flow chart illustrating artifact compensation method 400. Artifact compensation method 400 provides an imaging solution for induced artifacts on an image to be printed, including mechanically induced artifacts. At step 402, red, green, blue image data regarding a specific image to be printed is provided to an inkjet printer from a computer or CPU electrically coupled to the printer. Other known methods of providing red, green, blue image data to the inkjet printer are also acceptable. At step 404, a mask or error profile is generated and includes known problem colors. At step 406, known problem colors are identified and provided to the mask or error profile. At step 408, it is determined whether modifications to the imaging process due to color association artifacts are needed. If modifications are necessary, the image is modified to reduce the effect of the one or more color artifacts, as shown at step 412. The modification to the image to reduce the effect of a color artifact is more particularly shown and described in modification steps shown and described with reference to FIGS. 5 and 6. At step 414, an image error profile is generated.

At step 410, red, green, blue, and cyan, magenta, yellow color matching is provided, while at step 416, cyan, magenta, yellow half-toning is provided. At step 418, a mask or error profile regarding problem patterns is generated. At step 420, known problem patterns are accessed. The known problem patterns are identified from previous print jobs or from empirical information stored without the driver of the printer. At step 422, it is determined whether modification to the image process due to the known problem patterns is needed. If modifications are not necessary, the image is printed as shown at step 424. However, if modifications are needed, image data associated with the image is modified to reduce the effect of the known pattern artifact, as shown at step 426. The modification to the image to reduce the effect of a pattern artifact is more particularly shown and described in the modification steps shown and described with reference to FIGS. 5 and 6. Therefore, the image data associated with the image to be printed is modified prior to printing the image at step 424. Thus, during the print process, corrections for known color and pattern artifacts are applied to the image.

At step 428, an image error profile is generated, which includes data or information regarding the induced pattern artifact for future reference. At step 430, it is determined whether another copy of the print image associated with red, green, blue image data 402 has been requested. If such a request has been made, the image is printed again, as shown at step 424. Conversely, if there has been no request to reprint the image, it is determined at step 432 whether a new image to be printed is requested. If a new image to be printed is requested, artifact compensation method 400 is repeated, beginning with red, green, blue image data step 402. If a new image is not requested at step 432, the process is complete, as shown at end step 434.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A method of a printer compensating for induced artifacts on an image to be printed, the method comprising:

processing the image to be printed;

identifying an image region of the image susceptible to at least one artifact;

modifying an imaging process to reduce an effect of the at least one artifact on the image region by modifying a percentage of chance an ink drop at each pixel location of the image is randomly altered based upon a location of the pixel and based upon a location of the image region susceptible to the at least one artifact; and printing the image.

2. The method of claim 1, wherein modifying the imaging process further comprises:

modifying the pattern of placement of at least one ink color where the percentage of ink fill is in the range of 75-125 percent to reduce the effect of the at least one artifact on the image region.

3. The method of claim 1, wherein modifying the imaging process further comprises:

ascertaining a percent of random ink displacements at each pixel location of the image caused by the at least one artifact;

ascertaining a correction factor representative of the percentage of random ink displacements and representative of at least one color to be provided at each pixel location of the image; and providing an additional amount of ink at each pixel location based upon the correction factor.

4. The method of claim 3, wherein ascertaining a correction factor further comprises:

ascertaining a correction factor representative of the percentage of random ink displacements of the at least one color of the set of colors including cyan, yellow, magenta, and black to produce the desired color.

5. The method of claim 3, and further comprising:

generating an error profile for the image to be printed identifying the image region susceptible to the at least one artifact.

6. The method of claim 1, wherein modifying the imaging process further comprises:

modifying a percentage of chance that a line of ink drops may be randomly altered.

7. The method of claim 6, wherein modifying a percentage of chance further comprises:

modifying the percentage of chance that the line of ink drops may be randomly altered based upon a location of the line of ink drops and based upon a location of the image region susceptible to the at least one artifact.

8. The method of claim 1, wherein modifying image data further comprises:

modifying the pattern of placement of at least one ink color to reduce the effect of the at least one artifact on the image region.

9. The method of claim 1, wherein modifying image data further comprises:

modifying the placement of at least one ink color to reduce the effect of the at least one artifact on the image region.

10. The method of claim 1, wherein modifying image data further comprises:

modifying the combination of ink colors to be applied during the printing process to reduce the effect of the at least one artifact on the image region.

11. The method of claim 1, wherein modifying the combination of ink further comprises:

modifying the percentage of at least one ink color to reduce the effect of the at least one artifact on the image region.

12. The method of claim 1, wherein modifying the imaging process further comprises:

modifying image data associated with the image region susceptible to at least one artifact to reduce the effect of the at least one artifact one the image region.

13. The method of claim 12, wherein modifying the combination of ink further comprises:

modifying image data associated with at least one ink color to reduce the effect of a bottom of a field transfer error on the image region.

14. The method of claim 12, wherein modifying the combination of ink further comprises:

modifying image data associated with at least one ink color to reduce the effect of a top of a field transfer error on the image region.

15. The method of claim 12, wherein modifying the combination of ink further comprises:

modifying image data associated with at least one ink color to reduce the effect of a mechanical paper feed through error on the image region.

16. The method of claim 12, wherein modifying the combination of ink further comprises:

modifying image data associated with at least one ink color to reduce a grain effect on the image region.

17. The method of claim 12, wherein modifying the combination of ink further comprises:

modifying image data associated with at least one ink color to reduce a noise effect on the image region.

18. The method of claim 1, wherein modifying the imaging process further comprises:

randomizing nozzle locations of nozzles used to provide ink to generate the image, thereby reducing the effect of the at least one artifact on the image region.

19. The method of claim 1, wherein modifying the imaging process further comprises:

randomizing a pattern of placement of at least one ink color to reduce the effect of the at least one artifact on the image region.

20. The method of claim 1, wherein modifying the imaging process further comprises:

randomizing the direction of placement of at least one ink drop on the image to reduce the effect of the at least one artifact.

21. The method of claim 1, wherein modifying the imaging process further comprises:

randomizing an amount of displacement of at least one ink drop on the image to reduce the effect of the at least one artifact.

22. The method of claim 1, wherein modifying the imaging process further comprises:

randomizing the direction of placement of a line of ink drops on the image to reduce the effect of the at least one artifact.

23. The method of claim 1, wherein modifying the imaging process further comprises:

randomizing an amount of displacement of a line of ink drops on the image to reduce the effect of the at least one artifact.

24. A method of a printer compensating for induced artifacts on an image to be printed, the method comprising:

identifying an image region of the print job susceptible to at least one artifact;

modifying an imaging process to reduce an effect of the at least one artifact on the image of the print job by modifying a percentage of chance a pattern of placement of at least one ink color throughout the entire image is altered;

running an electronic process; and running a mechanical process, thereby printing the print job.

25. The method of claim 24, wherein modifying the imaging process further comprises:

modifying the pattern of placement of at least one color of ink where the percentage of ink fill is in the range of 75-125 percent to reduce the effect of the at least one artifact on the image region.

26. The method of claim 24, wherein modifying the imaging process further comprises:

ascertaining a percent of random ink displacements at each pixel location of the image caused by the at least one artifact;

ascertaining a correction factor representative of the percentage of random ink displacements and at least one color to be provided at each pixel location of the image; and providing an additional amount of ink at each pixel location based upon the correction factor.

27. The method of claim 26, wherein ascertaining a correction factor further comprises:

ascertaining a correction factor representative of the percentage of random ink displacements of at least one color of the set of colors including cyan, yellow, magenta, and black to produce the desired color.

28. The method of claim 26, and further comprising:

generating an error profile for the image to be printed identifying the image region susceptible to the at least one artifact.

29. The method of claim 24, wherein modifying the imaging process further comprises:

modifying a percentage of chance that at least one ink drop may be randomly altered.

30. The method of claim 29, wherein modifying a percentage of chance further comprises:

modifying the percentage of chance that at least one ink drop may be randomly altered based upon a location of the ink drop and based upon a location of the image region susceptible to the at least one artifact.

31. The method of claim 24, wherein modifying the imaging process further comprises:

modifying a percentage of chance that a line of ink drops may be randomly altered.

32. The method of claim 24, wherein modifying a percentage of chance further comprises:

modifying the percentage of chance that the line of ink drops may be randomly altered based upon a location of the line of ink drops and based upon a location of the image region susceptible to the at least one artifact.

33. The method of claim 24, wherein modifying image data further comprises:

modifying the pattern of placement of at least one ink color applied to the image region to reduce the effect of the at least one artifact on the image region.

34. The method of claim 24, wherein modifying image data further comprises:

modifying the placement of at least one ink color applied to the image region to reduce the effect of the at least one artifact on the image region.

35. The method of claim 24, wherein modifying image data further comprises:

modifying the combination of ink colors to be applied during the printing process to reduce the effect of the at least one artifact on the image region.

36. The method of claim 24, wherein modifying the combination of ink further comprises:

modifying the percentage of at least one ink color applied to the image region to reduce the effect of the at least one artifact on the image region.

37. The method of claim 24, wherein modifying the imaging process further comprises:

modifying image data associated with the image region susceptible to at least one artifact to reduce the effect of the at least one artifact one the image region.

38. The method of claim 37, wherein modifying the combination of ink further comprises:

modifying image data associated with at least one ink color to reduce the effect of a bottom of a field transfer error on the image region.

39. The method of claim 37, wherein modifying the combination of ink further comprises:

modifying image data associated with at least one ink color to reduce the effect of a top of a field transfer error on the image region.

40. The method of claim 37, wherein modifying the combination of ink further comprises:

modifying image data associated with at least one ink color to reduce the effect of a mechanical paper feed through error on the image region.

41. The method of claim 37, wherein modifying the combination of ink further comprises:

modifying image data associated with at least one ink color to reduce a grain effect on the image region.

42. The method of claim 37, wherein modifying the combination of ink further comprises:

modifying image data associated with at least one ink color to reduce a noise effect on the image region.

43. The method of claim 24, wherein modifying the imaging process further comprises:

randomizing nozzle locations of nozzles used to provide ink to generate the image, thereby reducing the effect of the at least one artifact on the image region.

44. The method of claim 24, wherein modifying the imaging process further comprises:

randomizing a pattern of placement of at least one ink color to reduce the effect of the at least one artifact on the image region.

45. The method of claim 24, wherein modifying the imaging process further comprises:

randomizing the direction of placement of at least one ink drop on the image to reduce the effect of the at least one artifact.

46. The method of claim 24, wherein modifying the imaging process further comprises:

randomizing an amount of displacement of at least one ink drop on the image to reduce the effect of the at least one artifact.

47. The method of claim 24, wherein modifying the imaging process further comprises:

randomizing the direction of placement of a line of ink drops on the image to reduce the effect of the at least one artifact.

48. The method of claim 24, wherein modifying the imaging process further comprises:

randomizing an amount of displacement of a line of ink drops on the image to reduce the effect of the at least one artifact.

49. A method of a printer compensating for induced artifacts on an image to be printed, the method comprising:

processing the image to be printed;

identifying an image region of the image susceptible to at least one artifact;

modifying an imaging process to reduce an effect of the at least one artifact by modifying a percentage of chance that a combination of ink colors to be applied at each pixel location of the image during the printing process is altered; and printing the image.

50. The method of claim 1, wherein modifying the image process further comprises:

reducing in magnitude an ink distribution parameter at a particular pixel location as a distance between the particular pixel location and the location of the image region susceptible to the at least one artifact increases.

* * * * *

UNITED STATES PATENT AND TRADEMARK OFFICE

CERTIFICATE OF CORRECTION

PATENT NO. : 7,724,397 B2
APPLICATION NO. : 11/016250
DATED : May 25, 2010
INVENTOR(S) : Je-Ho Lee et al.

It is certified that error appears in the above-identified patent and that said Letters Patent is hereby corrected as shown below:

In column 11, line 18, in Claim 12, delete "one" and insert -- on --, therefor.

In column 13, line 25, in Claim 37, delete "one" and insert -- on --, therefor.

Signed and Sealed this

Thirty-first Day of August, 2010

David J. Kappos

David J. Kappos
*Director of the United States Patent and Trademark Office*